US005609184A

United States Patent [19]

Apel et al.

[11] Patent Number: 5,609,184

[45] Date of Patent: Mar. 11, 1997

[54] REGULATING DEVICE

[75] Inventors: Peter Apel, Suedkirchen; Marion Hauschopp; Klaus Wilczek, both of Werne, all of Germany

[73] Assignee: AB Elektronik GmbH, Werne, Germany

[21] Appl. No.: 491,951

[22] PCT Filed: Nov. 18, 1994

[86] PCT No.: PCT/EP94/03825

§ 371 Date: Sep. 20, 1995

§ 102(e) Date: Sep. 20, 1995

[87] PCT Pub. No.: WO95/14911

PCT Pub. Date: Jun. 1, 1995

[30] Foreign Application Priority Data

Nov. 20, 1993 [DE] Germany .......................... 9317797 U

[51] Int. Cl.$^6$ .......................... F16K 31/02

[52] U.S. Cl. .......... 137/554; 251/129.04; 251/129.11; 251/368

[58] Field of Search .......................... 137/554, 553; 251/368, 129.04, 129.11

[56] References Cited

U.S. PATENT DOCUMENTS

| | | | |
|---|---|---|---|
| 3,602,254 | 8/1971 | Fawkes | 137/554 |
| 4,316,254 | 2/1982 | Levin et al. | 324/72.5 |
| 4,601,211 | 7/1986 | Whistler | 137/554 |
| 4,694,390 | 9/1987 | Lee | 137/554 |
| 4,967,792 | 11/1990 | Magee | 137/554 |
| 5,148,106 | 9/1992 | Ozawa | 324/207.21 |
| 5,257,014 | 10/1993 | Zimmermann | 137/554 |

FOREIGN PATENT DOCUMENTS

| | | |
|---|---|---|
| 4021691 | 1/1992 | Germany . |
| 2275030 | 9/1990 | Japan . |
| WO9210722 | 6/1992 | WIPO . |

*Primary Examiner*—A. Michael Chambers
*Attorney, Agent, or Firm*—Furgang & Milde, LLP

[57] ABSTRACT

The proposed device is intended for use in motor vehicles and permits a high level of accuracy in measurement and simple and cost-effective manufacture. It comprises a shaft component (12) arranged adjustably in a housing element (21) and a rotating unit (20') of a rotation angle sensor (2) which can move in relation to the fixed unit (20). The stator element (21) consists of two rounded cusp-shaped subcomponents held with a bracing unit and secured in a stator mount (23). There is a clearance recess between the subcomponents of the stator element. The rotating unit (20') is a ring-shaped magnet element (24) held by a magnet holder (26,27) connected to the shaft element (12); this arrangement allows the magnet element (24) to move around the stator element subcomponents leaving an air gap (25). The housing element (13) can be constructed in many parts. The stator mount (23) and parts of the multiple-component housing element (13) can be moulded from an electrically conducting long-fibre granulate with 1%–10% by volume stainless steel filaments. This creates a high degree of shielding against electromagnetic influences.

17 Claims, 6 Drawing Sheets

REGULATING DEVICE

BACKGROUND OF THE INVENTION

The present invention relates to a regulating device.

A magnetic probe is known from the published International Patent Application No. WO 92/10722. It comprises a magnet that surrounds a rotating shaft and a stator associated with the magnet. The stator is secured to a housing by a holder. A Hall sensor and an exciter coil face each other in a recess in the stator.

Although this probe has been proven, it needed to be further developed for use in motor vehicles.

An overall throttle-valve assembly is known from the German Patent No. 4,021,691 A1. It comprises a housing accommodating a throttle valve that spins on a shaft. Attached to the shaft are a potentiometer and a transmission. The transmission is powered by an electric motor. A regulating device compares signals representing engine speed, for example, and intercepted by the potentiometer and regulates the throttle valve by way of the motor.

There is a drawback in that, since the mechanisms and regulating device are accommodated in a housing, the whole valve must be removed and replaced in the event of a malfunction. It is too expensive to repair the defective components, so that the whole useless valve must be discarded. Another drawback is that the potentiometer is not precise enough.

SUMMARY OF THE INVENTION

The object of the present invention is accordingly to so improve a regulating device that operates magnetically in conjunction with a angle-of-rotation sensor that (1) they can be used in motor vehicles, (2) they are very precise, and (3) they can be manufactured easily and cost-effectively.

This object as well as other objects which will become apparent from the discussion that follows, are achieved in accordance with the present invention, by providing a shaft component arranged adjustably in a housing element and a rotating unit of a rotation angle sensor which can move in relation to the fixed unit. The stator element preferably consists of two rounded cusp-shaped subcomponents held with a bracing unit and secured in a stator mount. A clearance recess is provided between the subcomponents of the stator element. The rotating unit is a ring-shaped magnet element held by a magnet holder connected to the shaft element; this arrangement allows the magnet element to move around the stator element subcomponents leaving an air gap.

The particular advantages obtainable in accordance with the present invention are that the magnet can be secured directly to the shaft by the magnet holder and the stator and electromagnetic components directly to the housing that houses the overall throttle-valve assembly or a similar structure by the stator holder. It is accordingly possible to manufacture these subassemblies independent of the overall assembly. The result is the major advantage that the components comprising the angle-of-rotation sensor can be attached to overall throttle-valve assemblies of different types. Maintenance and repair etc. are also essentially more cost-effective and rapid.

Another very essential advantage is that the stator-tensioning subassembly secures the stator in the stator holder without screws or other fasteners.

The stator-tensioning subassembly ensures that the stator will be positioned precisely in its holder and will not need to be adjusted to the rotating components. Again, the stator-tensioning subassembly represents a simple means of preventing rotation and displacement on the part of the stator components, which will remain stationary enough to provide precise and reproducible results.

It is of advantage for the stator components to have at last one approximately 45° bezel and at least one accommodating bore for a tensioning pin to extend through. The bezels affect the magnetic flux and increase the precision of the angle-of-rotation sensor. The stator components can comprise stamped-out blanks of specially treated, "textured", sheet metal stacked into packages. The stator components are designed in particular to prevent magnetization losses in the stator from contaminating the results.

It is also of advantage for the stator-tensioning subassembly to comprise an essentially round stator-tensioning plate and at least one stator-tensioning pin for each stator. The plate rests on the stator and is secured to the base of the stator holder by the pins extending through the stator components. The resulting tension maintains the blanks of sheet metal in each stator precisely stacked and secured to the base of the stator holder. The stator-tensioning pins have two functions. First, they prevent lateral displacement on the part of the individual blanks. Second, they maintain the tightness of the overall stack and prevent the blanks from rotating.

This objective is attained in particular in that the stator-tensioning plate and the stator-tensioning pins and their attachment to the base of the stator holder are of thermoplastic. It is preferable for the plastic to be injection-molded. This approach exploits the plastic's properties of ductility, elasticity, and permanence. Such particular stresses as impact, heat, moisture, etc. will have no affect on the stator-tensioning subassembly's tensioning and securing capacities.

It is also of advantage for the clearance between the stator components to accommodate an electromagnetic component, a Hall sensor for example. This approach ensures extremely precise results. The results will also be especially precise when the stator comprises two components shaped like segments of an orange and with clearance between them. Such components will render the magnetic flux linear. It is preferable to pack the clearance with resin to prevent the Hall sensor from oscillating. It is of course also possible to pack the clearance with any other material that has similar or identical properties.

The magnet-holder subassembly preferably comprises a hollow cylindrical magnet holder and a spacing disk. The spacing disk is attached to the shaft and can be introduced into and secured in the magnet holder. The magnet holder, the spacing disk, and the magnet accordingly constitute a rotor, itself attached to the shaft. The rotor is protected by and can move freely inside the stator holder.

It is also of advantage for the annular magnet to be a hollow cylinder that can be introduced into and secured in the magnet holder. This system makes it possible for the rotating components of the angle-of-rotation sensor to fit together and be easily installed. The magnet can be a permanent magnet. It can be made of the materials ordinarily employed for permanent magnets. It is of course also possible to employ an electromagnet instead of a permanent magnet.

It is also of advantage for the housing to constitute an overall throttle-valve assembly in at least two separate sections, specifically a throttle-valve housing section, an actuator housing section, a regulating-mechanism housing section, and a electronics housing section. In this event a throttle valve and its shaft are accommodated in the throttle-valve housing section with the shaft extending out of it. The components of the angle-of-rotation sensor, specifically the stator, which is accommodated in the stator holder, and the annular magnet, which is secured by the magnet holder and by the spacing disk, are accommodated along with a transmission subassembly, a circuitry subassembly, and a motor subassembly in at least one other section of the housing, specifically the actuator housing section, the regulating-mechanism housing section, or the electronics housing section. Once the actuator housing and the regulating-mechanism housing are in position on the throttle housing accommodating at least the angle-of-rotation sensor and the transmission subassembly, the shaft that extends out engages both the transmission subassembly and the spacing disk in the angle-of-rotation sensor, creating a force fit connection.

A "regulating device" is to be construed hereinafter as not only an overall throttle-valve assembly with a angle-of-rotation sensor but also as an overall throttle-lever assembly with a rotating or similar mechanism that rotates a shaft to an extent monitored by an integrated angle-of-rotation sensor.

The separate accommodations for the essential subassemblies involved in an overall throttle-valve assembly in separate housing sections makes it possible to operate them separately. Furthermore, all overall throttle-valve assemblies can be provided with subassemblies of only a few basic designs. What is essential is that it accordingly becomes possible to provide new or rebuilt overall throttle-valve assemblies deriving from different manufacturers with the same type of regulating device. Defective regulating devices can be replaced with new ones in the course of repair with little intervention and with no need to remove the overall throttle-valve assembly and scrap it if necessary. The prong-in type of force fit represented by the throttle-valve shaft between the angle-of-rotation sensor and the transmission subassembly can be rapidly disestablished and re-established.

It is also of advantage for the angle-of-rotation sensor, the transmission subassembly, the circuitry subassembly, and the motor subassembly to be combined into a throttle-valve regulating mechanism. Such a mechanism can be accommodated in an actuator housing section constituting the second section of the housing. The electric and mechanical controls are all accommodated in the same housing section in this embodiment. Fitting the throttle-valve housing section and actuator housing section together automatically establishes the aforesaid form fit represented by the throttle-valve shaft between the angle-of-rotation sensor and the transmission subassembly on the one hand and an automatically aligning connection at the other end. The transmission subassembly can be accommodated in a transmission housing section.

It is also of advantage for the angle-of-rotation sensor, the transmission subassembly, and the motor subassembly to be accommodated in a regulating-mechanism housing section constituting the second section of the housing and the electronics subassembly to be accommodated in an electronics housing section constituting the third section of the housing. The throttle-valve regulating mechanism is accordingly divided into its strictly control and essentially regulating components. Separating the circuitry subassembly and accommodating it in a separate electronics housing section allows the third section of the housing to be accommodated at very many points inside the vehicle. It is of course also possible to stack all three subassemblies together. The tripartite division of the housing will in this event provide the particular advantage of a wide range of variation and adaptation to various applications and needs.

It is also of advantage for either the throttle-valve housing section and the actuator housing section or the throttle-valve housing section and the regulating-mechanism housing section and optionally the electronics housing section to be attached together by prongs or clips or both. "Prongs" are to be construed in this context as protective-contact prongs, electronics prongs, etc. "Clips" are essentially specially shaped springs that snap into a projection or recess etc. The prongs and clips allow the three housing sections to fit together smooth and tight and be easily separated. The result is particularly simple assembly and disassembly.

The throttle-valve housing section can be a casting, especially a light-metal casting.

It is also of advantage for the stator holder to be a hollow cylinder open along one side and secured at its wall to the open side of the throttle-valve housing section or to the transmission-subassembly housing section. The stator holder accordingly not only assumes the function of holding the stator but also acts as an exterior protection for the overall angle-of-rotation sensor. The direct connection to the housing makes it possible to encapsulate the overall angle-of-rotation sensor tight, so that dirt, oil, dust, etc. cannot affect the function of the angle-of-rotation sensor.

The circuitry subassembly can be accommodated in a central depression in the housing. The electric component is accordingly protected from both mechanical stress and from such environmental factors as dust and oil. The circuitry subassembly can also have a receptacle that the stator holder can be inserted into.

The stator holder in another embodiment of the present invention is a cap that can be manufactured along with the central depression, the actuator housing section, the regulating-mechanism housing section, and the electronics housing section of a plastic material, plastic itself for example and especially a high-strength plastic or an electrically conductive thermoplastic or both. The particular material depends on the particular application.

It is also of advantage for the actuator housing section, the regulating-mechanism housing section, and the electronics housing section to be molded ready to use with its electrical and mechanical accommodations already in and through it from an electrically conductive thermoplastic reinforced with steel fiber. The result is housing sections that are simple and can in particular be molded ready to use while exhibiting the properties of an essentially more complicated to manufacture metal housing section. The electrically conductive thermoplastic makes it possible to produce almost any shape with high accuracy. Convexities, concavities, and perforations can be handled without molding problems.

It is also of advantage for the electrically conductive thermoplastic to be an electrically conductive long-fiber granulate containing 1% to 10% steel fiber by weight. The result will be an impedance of 10 to 100 Ω·cm, allowing shielding of 55 to 70 dB. A granulate with up to 60% by weight of fibers as long as the trimmed billet, 10 mm for example. Traditional short-fiber compounds have fibers only 0.3 mm long by comparison. The extremely long fibers in accordance with the present invention provide the thermoplastic with particular rigidity and toughness. A tensile strength of 43.47 to 79.35 N/mm$^2$ and a modulus of elasticity of 1380 to 4830 N/mm$^2$ can be attained. The material attains a transverse strength of 42.78 to 122.82 N/mm$^2$ with a modulus of inflection of 1380 to 4140 N/mm$^2$. IZOD impact strength is 10.4 to 62.4 J/m. There are ten types of electrically conductive long-fiber granulates available.

The electric-wiring perforations are lined with plastic insulation. It is also of advantage to keep the electrically active components inside the insulating plastic. The overall throttle-valve assembly will accordingly be ready to use. It is also possible to line the instrumentation perforations with plastic. It is of course also possible to use other types of insulation instead of plastic.

Terminal strips, prong-in components, and ground connections for example, can be molded into the housing sections. Such an approach will make it possible for the prong-in components and ground connections to raise the housing subassembly to a desired level of potential. A constant level of potential will discharges.

The present invention will now be specified with reference to the accompanying drawing.

DESCRIPTION OF THE PREFERRED EMBODIMENTS

Figure 1:
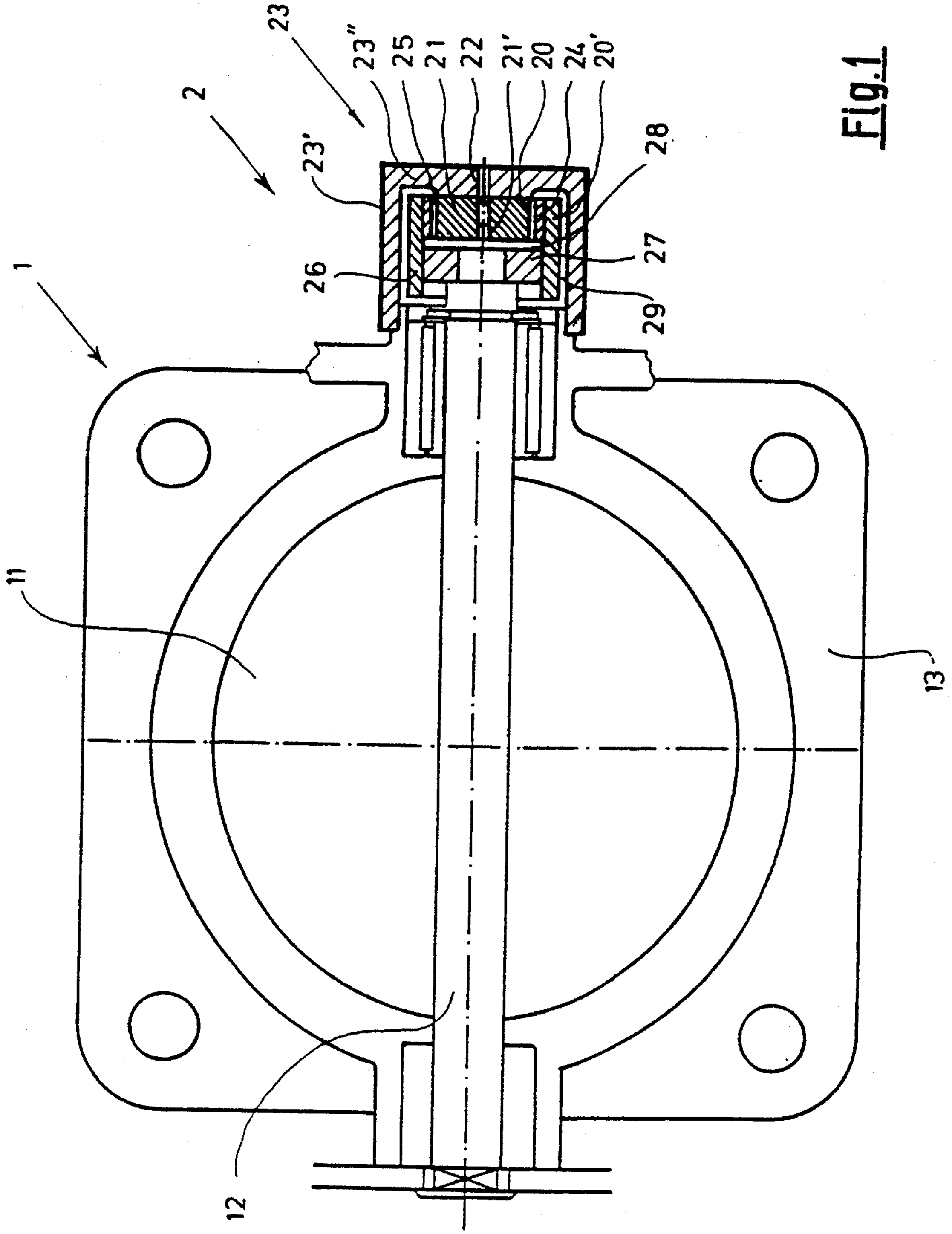
FIG. 1 is a schematic and partly sectional view of an overall throttle-valve assembly with a angle-of-rotation sensor attached.

FIG. 1 illustrates an overall throttle-valve assembly 1 attached to a angle-of-rotation sensor 2.

Throttle-valve assembly 1 comprises a throttle valve 11 mounted on a shaft 12 and accommodated in a housing 13.

Angle-of-rotation sensor 2 comprises a stationary sensor subassembly 20 and a rotating sensor subassembly 20'.

Figure 4:
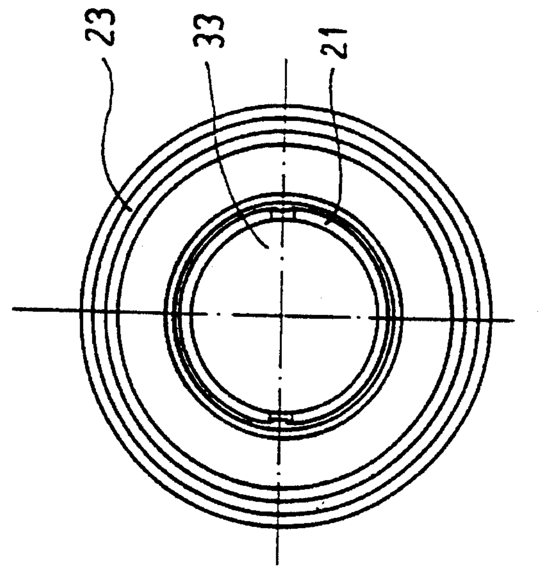
FIG. 4 is a schematic front view of the stationary components of the angle-of-rotation sensor illustrated in FIG. 1.
Figure 3:
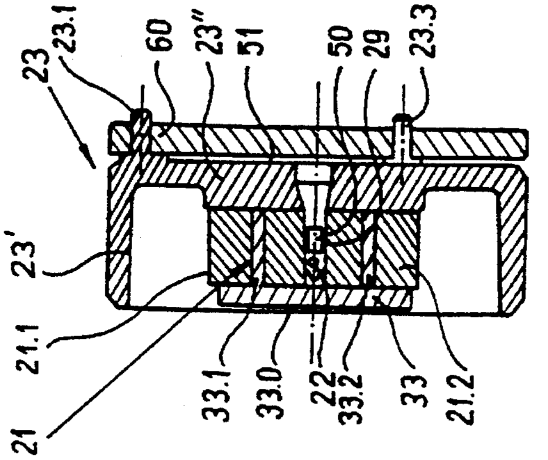
FIG. 3 is a schematic section through the stationary components of the angle-of-rotation sensor illustrated in FIG. 1.
Figure 2:
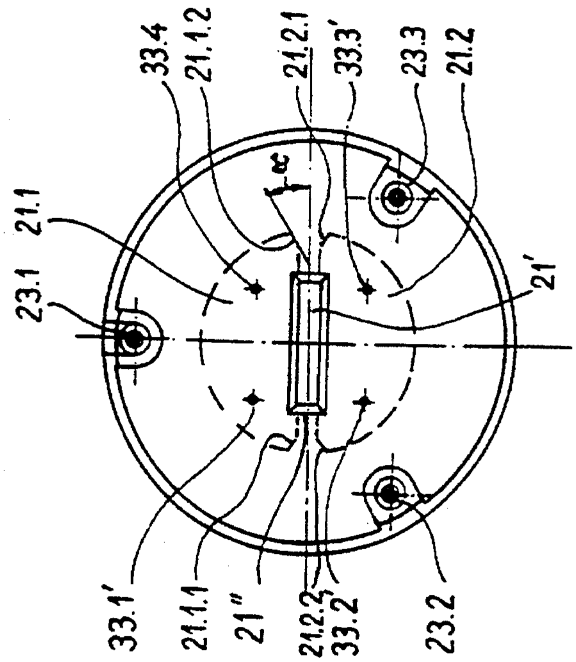
FIG. 2 is a schematic rear view of the stationary components of the angle-of-rotation sensor illustrated in FIG. 1.

Stationary sensor subassembly 20 is illustrated in detail in FIGS. 2, 3, and 4. It includes a stator 21 comprising two facing stator components 21.1 and 21.2 shaped like blunted crescents. The edges of stator components 21.1 and 21.2 are provided with bezels 21.1.1 and 21.1.2 and 21.2.1 and 21.2.2. Between stator components 21.1 and 21.2 is a clearance 21". Bezels 21.1.1 and 21.1.2 and 21.2.1 and 21.2.2 are at an angle $\alpha$ of 45°. Stator components 21.1 and 21.2 accordingly resemble segments of an orange, or, within the bevels, of a tangerine when viewed from above. Each stator component 21.1 and 21.2 comprises a stack of blanks stamped out of sheet metal. The metal can in particular be textured.

Magnetizability is affected by crystalline-energy directional forces. Weakly magnetizable materials exhibit a low crystalline anisotropy that decreases even more as the randomly oriented crystals are forced into alignment by such foreign factors as rolling. Once the direction of the outer field parallels the direction of least magnetizability, remanence will be almost at the threshold of saturation. The individual magnetic moments of the Weiss regions will already be aligned and will require no more rotation. Coercive-field strength and initial permeability are structure-sensitive state parameters that vary considerably just as a result of slight variations in chemical composition or even heat treatment or mechanical deformation. Mechanical stresses in the material reduce the motility of the walls of the Weiss regions. These stresses can occur due to a) compression or tension during magnetic excitation, b) plastic deformation accompanying shaping or heat treatment, or c) magnetostrictive stress.

Increasing permeability basically increases sensitivity to mechanical stress, and all mechanical shaping operations that might lead to structure changes and mechanical stress must accordingly be avoided. Because more permanent deformation occurs in thicker sheets, they are more sensitive than thinner sheets. The losses that derive from compressing coated cores can be as high as 10% at pressures of approximately 15 kp/cm$^2$. Cold-rolled sheet has better magnetic properties in the direction of rolling. They derive from particular crystallographic situations in the structure (texture). Iron and iron-silicon alloys for example are easier to magnetize along the edges of the cubes in the [100] direction of the cubical-space lattice than along the diagonals of the plane or space (cube-edge texture). An alloy of 50% nickel and 50% iron is the easiest to excite magnetically when one side of a cube parallels the surface of the sheet and the edges of the cube are parallel and at an angle of 90° to the larger field (cube-face texture). Materials with cube-face texture have outstanding rectangular hysteresis loops. Sheet metal treated in this way is called textured. It is obviously also possible to construct stator components 21.1 and 21.2 of other and otherwise processed materials.

Stator components 21.1 and 21.2 comprising separate blanks of thinner textured sheet are provided with tensioning-pin accommodating bores 33.1', 33.2', 33.3', and 33.4' or bezels 21.1.1 and 21.1.2 and 21.2.1 and 21.2.2. The stacked components are accommodated in a stator holder in the form of an essentially cylindrical cap 23 comprising a wall 23' and a base 23". Base 23" has an elevation at the center that more or less coincides with the circumference of the facing stator components 21.1 and 21.2. It is simultaneously possible for the elevation to accommodate matching depressions coinciding with tensioning-pin accommodating bores 33.1', 33.2', 33.3', and 33.4'. The stator components 21.1 and 21.2 that rest thereon are secured by a stator-tensioning subassembly 33 comprising a plate 33.0 and pins 33.1, 33.2, and 33. Plate 33.0 covers both stator components 21.1 and 21.2. Pins 33.1, 33.2, and 33 extend through both the plate and the stator components and into accommodations in base 23". Stator components 21.1 and 21.2 are accordingly reliably secured and the individual blanks forced together with just enough force to prevent increased losses and hence contamination of the sensor results. It is of course also possible to injection-mold the specially compacted stator components 21.1 and 21.2 of plastic along with stator-tensioning subassembly 33 and stator holder 23 or at least base 23" or sections thereof. The base of stator holder 23 can also be provided with fasteners 23.1, 23.2, and 23.3 in the from of dowels that can be inserted in a flat receptacle 60. Also at the center of base 23" is a central depression 21' more or less in the form of a groove.

As will be evident from FIGS. 2 and 3, central depression 21' and clearance 21" are wide enough to match to a considerable extent. An electromagnetic component, a Hall sensor 22 for example, fits into clearance 21". It is also possible to fill clearance 21" with resin to cushion Hall sensor 22. A circuitry subassembly 50 can be inserted in central depression 21' below. Since circuitry subassembly 50 is a printed circuit, it can easily fit in central depression 21'. It is of course also possible for such a circuitry subassembly 50 to be inserted first into clearance 21" and simultaneously into the resin. It is also possible to introduce the resin into central depression 21' and embed circuitry subassembly 50 into it. The subassembly will be cushioned in either event.

Figure 5:
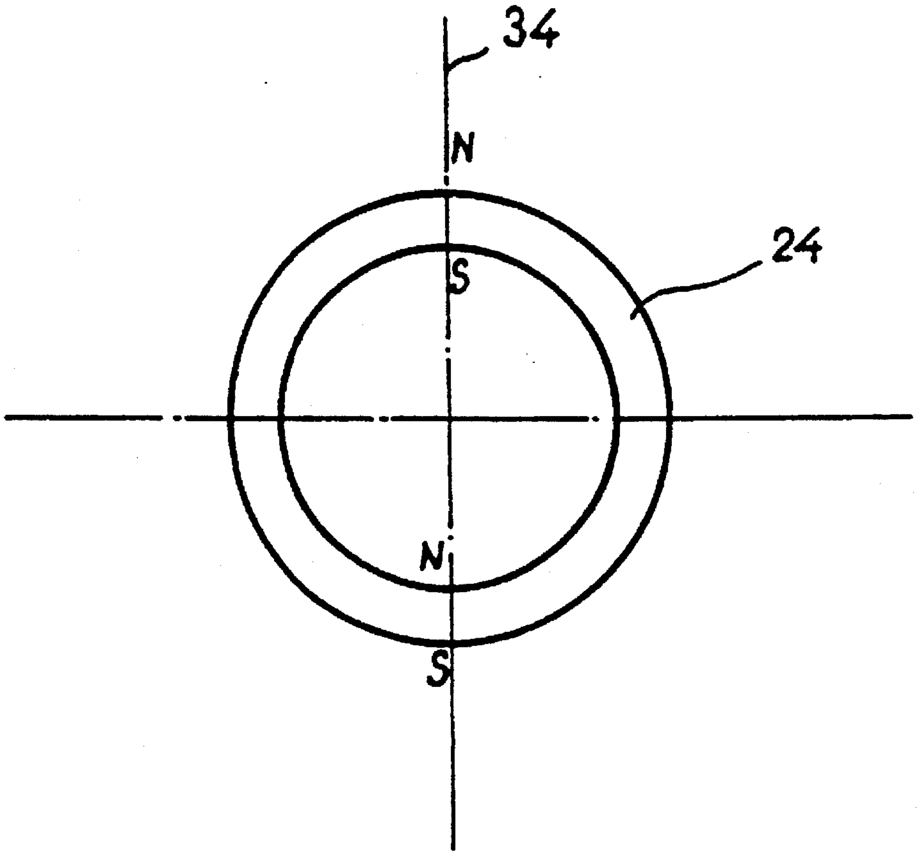
FIG. 5 is a schematic front view of the rotating components of the angle-of-rotation sensor illustrated in FIG. 1.

The subassembly 20' that rotates around stationary sensor subassembly 20 includes a magnet 24 that, as will be evident from FIG. 5, is annular. Magnet 24 has, along an axis 34 extending through its center, a north pole on its outer surface, a south pole at the same point on its inner surface, another north pole at the opposite point on its inner surface, and another south pole at the same point on its outer surface. The magnetic flux will accordingly be linear in particular inside magnet 24. The magnet is secured by a magnet-holder subassembly. This subassembly comprises a spacing disk 27 that can be inserted into and secured in a cylindrical magnet holder 26. Spacing disk 27 is directly attached to throttle-valve shaft 12. Once stator holder 23 has been secured to throttle-valve housing 13, there will be a gap 28 between spacing disk 27 and stator 21. Between the cylindrical wall 23' and magnet holder 26 is another gap 29. Magnet holder 26, the magnet 24 it accommodates, and spacing disk 27 accordingly constitute a rotor subassembly that is protected by and can move freely within. If the joint between stator holder 23 and housing 13 is sealed, stator holder 23 will function not only as a holding mechanism but also as an outer protection. It is simultaneously possible for a power-supply wire 51 to extend out from circuitry subassembly 50. This approach protects the overall angle-of-rotation sensor 2 from outer factors, especially the extreme heat that prevails in an engine, along with dust, grease, moisture, etc.

One advantage of the angle-of-rotation sensor 2 specified herein is that it is very easy to install along with overall throttle-valve assembly 1 as will now be specified.

Spacing disk 27 is mounted over the end of shaft 12 extending out of throttle-valve housing 13. The projecting end of the shaft is cottered. Magnet holder 26 is mounted with a magnet 24 already in it over spacing disk 27. Once the individual components of rotating sensor subassembly 20' have been adjusted and aligned on throttle-valve shaft 12, a stator holder 23 in the form of a cap accommodating a stator 21 in accordance with the present invention and with a Hall sensor 22 in clearance 21" is mounted over magnet holder 26 with wire 51 extending out. That the various sections slide back and forth easily along the shaft and can be secured at any position ensures excellent adjustability, and an air gap 25 can be established very easily along with gaps 28 and 29. Stator holder 23 is now secured to throttle-valve housing 13 at cylindrical wall 23'. A gasket of metal or a resilient material can be introduced between wall 23' and housing 13. The halves are threaded to ensure a permanent and stable joint between the wall and the housing 13. This is a very simple way and means of manufacturing and mounting a angle-of-rotation sensor 2. The simple and elegant means of securing stator 21 to the base 23" of stator holder 23 in particular allows precise adjustment of subassemblies 20 and 20', facilitating manufacture and adjustability along with precise measurement and transmission of results. Precision is further increased by the bezels 21.1.1 and 21.1.2 and 21.2.1 and 21.2.2 on stator components 21.1 and 21.2. When, specifically, magnet 24 goes out of alignment due to a change in position of throttle-valve shaft 12, axis 34 will also rotate, 45° for example. At an angle of 45° on the other hand, the magnetic flux will travel perpendicularly through bezels 21.1.1 or 21.1.2 or 21.2.1 or 21.2.2. Securing stator 21 by means of a stator-tensioning subassembly 33 will accordingly also ensure reliable and precise security even when the sensor is subjected to considerable jolting. It is accordingly ensured that angle-of-rotation sensor 2 will, due to its special security system, operate reliably and precisely even in the most difficult conditions.

Figure 6:
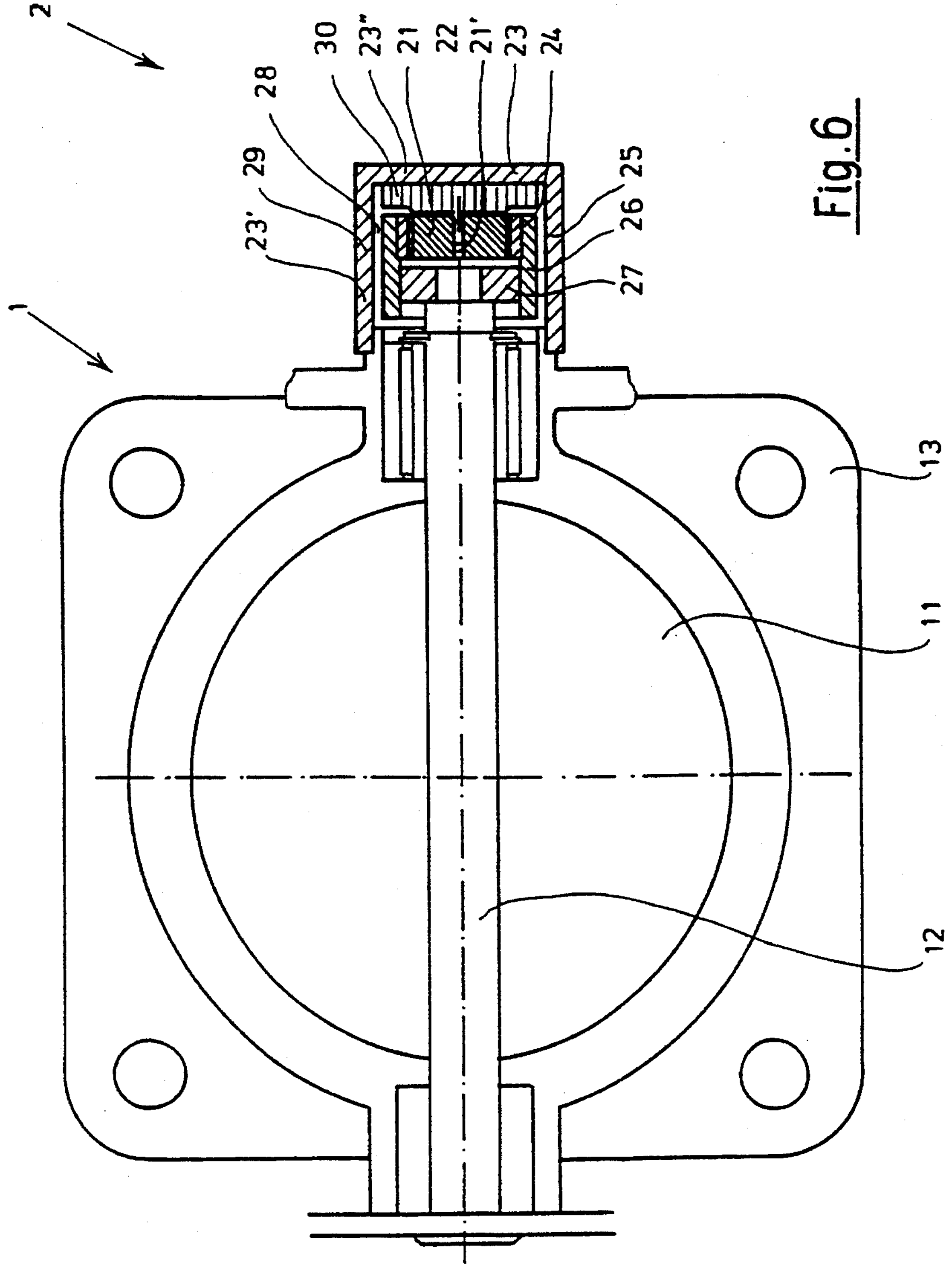
FIG. 6 is a schematic and partly sectional view of the overall throttle-valve assembly illustrated in FIG. 1 with a circuitry subassembly accommodated in the angle-of-rotation sensor.

FIG. 6 is another schematic longitudinal section through the subject of the present invention.

The angle-of-rotation sensor 2 in this embodiment is mounted directly against throttle-valve assembly 1.

Assembly 1 and sensor 2 are similar in design to those specified with reference to FIGS. 1 through 5.

A processing-circuitry assembly 30 is accommodated in the base 23" of stator holder 23. Stator 21 is positioned along with stator components 21.1 and 21.2 above circuitry assembly 30. It is simultaneously possible for the stator components to be form fit to the circuitry assembly. Circuitry assembly 30 can be an integrated circuit. The Hall sensor 22 can be integrated into it. It is of course also possible for the stator components to be directly attached to the inner surface of the cylindrical wall 23' of stator holder 23. Hall sensor 22 will extend into clearance 21", resulting in a direct operational relationship between them. The hollow cylindrical stator holder 23 is mounted directly on throttle-valve housing 13. All of the sensitive components of the angle-of-rotation sensor 2 in this embodiment are protected from such sources of damage that occur in an engine compartment as temperature variations, dust, oil, moisture, etc. One particular advantage is that all the components of sensor 2 are essentially cylindrical and accordingly very well adapted to the rotations of the throttle-valve shaft 12. Another very essential advantage is that the results are intercepted and processed directly on site. Such sources of contamination as long transmission lines are accordingly avoided.

Particularly of advantage is that the overall device can be easily installed as will now be described.

The overall throttle-valve assembly 1 is assembled and spacing disk 27 thrust over the section of the throttle-valve shaft 12 that extends out of throttle-valve housing 13 and secured. The magnet holder is thrust with magnet 24 already inside it over spacing disk 27. Care is taken to ensure precise adjustment of magnet 24 while the sections are being assembled.

Circuitry assembly 30 and stator 21 can simultaneously be introduced into stator holder 23. Since Hall sensor 22 is integrated into and extends out of circuitry assembly 30, it can be positioned precisely within in clearance 21". Stator 21 is introduced into magnet 24, leaving air gap 25. Gap 29 is left between magnet holder 26 and the inner surface of the cylindrical wall 23' of stator holder 23. Stator holder 23 is secured to throttle-valve housing 13 at wall 23' as heretofore described. Stator holder 23 accommodates central depression 21' which can be sealed off with the wiring extending out of it. The wires allow the processing circuitry and other components of angle-of-rotation sensor 2 to be attached to specific subassemblies.

Flat receptacle 60 itself can be designed to act as a circuitry assembly 30. Since the assembly will in this event be accommodated outside stator holder 23, it will be exposed to many external influences. It must accordingly be decided on a case-by-case basis whether the simplified assembly procedure justifies any possible sacrifice of precision.

Angle-of-rotation sensor 2 must be protected against such sources of damage in the engine compartment as heat, oil, moisture, etc. Stator holder 23 can for this purpose be molded of an electrically conductive long-fiber granulate containing 1% to 10% by volume of stainless-steel filaments. It is essential that the granulate contain up to 60% by weight of fibers as long as the trimmed billet, 10 mm for example. Such a stator holder 23 will be very rigid and tough.

A tensile strength of up to 79.35 $N/mm^2$ and a modulus of elasticity of up to 4830 $N/mm^2$ can be attained. The material attains a transverse strength of up to 122.82 $N/mm^2$. Impact strength is up to 88.4 J/m. Also essential are the shielding properties, represented by an impedance of up to 100 Ω·cm, a shielding factor of up to 70 dB at 1 GHz, and an electrostatic discharge of 0.03 s. If, for example, the electrically conductive thermoplastic has the properties:

steel-fiber portion, %: 6
specific weight, $g/cm^3$: 1.37
tensile strength, $N.mm^2$: 57.96
modulus of elasticity, $N/mm^2$: 4820
transverse strength, $N/mm^2$: 122.82
modulus of flexibility, $N/mm^2$: 4140
IZOD impact resistance, l/m: 10.4
impedance, Ω Z cm: 100
shielding factor, dB @1 GHz: 45
electrostatic discharge, s: 0.04 it will have a shielding factor of more than 50 dB at a frequency of between 20 MHz and 1 GHz.

Stator holder 23 is accordingly made of an electrically conductive plastic that has the advantage of any plastic in that it is easy to mold along with that of a metal with respect to shielding properties.

Circuitry assembly 30 is accommodated for example in the base 23" of stator holder 23. It is electrically insulated from stator holder 23 by encapsulation or by a special layer of insulating plastic for example. Stator 21 is positioned above circuitry assembly 30 or above the layer of insulation and secured with a special sensor-tensioning subassembly 33 of plastic. An insulating plastic that adheres either to base 23" or to circuitry assembly 30 and to the sensor-tensioning plate on the other side is introduced through the holes.

Hollow cylindrical stator holder 23 is positioned with it actuation-and-attachment opening 23''' directly against throttle-valve housing 13. Since stator holder 23 is manufactured of an electrically conductive thermoplastic with a steel filaments, the electrically active, meaning sensitive, components of angle-of-rotation sensor 2 will be shielded from electromagnetic effects. Since housing 13 and stator holder 23 are of an electrically conductive material, they will be at the same potential. It is of course also possible to cast a special ground connection into stator holder 23 with a cable secured to it. These measures will ensure that sensor 2 is electromagnetically compatible.

Depending on the required attenuation, the particular material employed will ensure the desired shielding, which can be between 45 and 75 dB.

Figure 7:
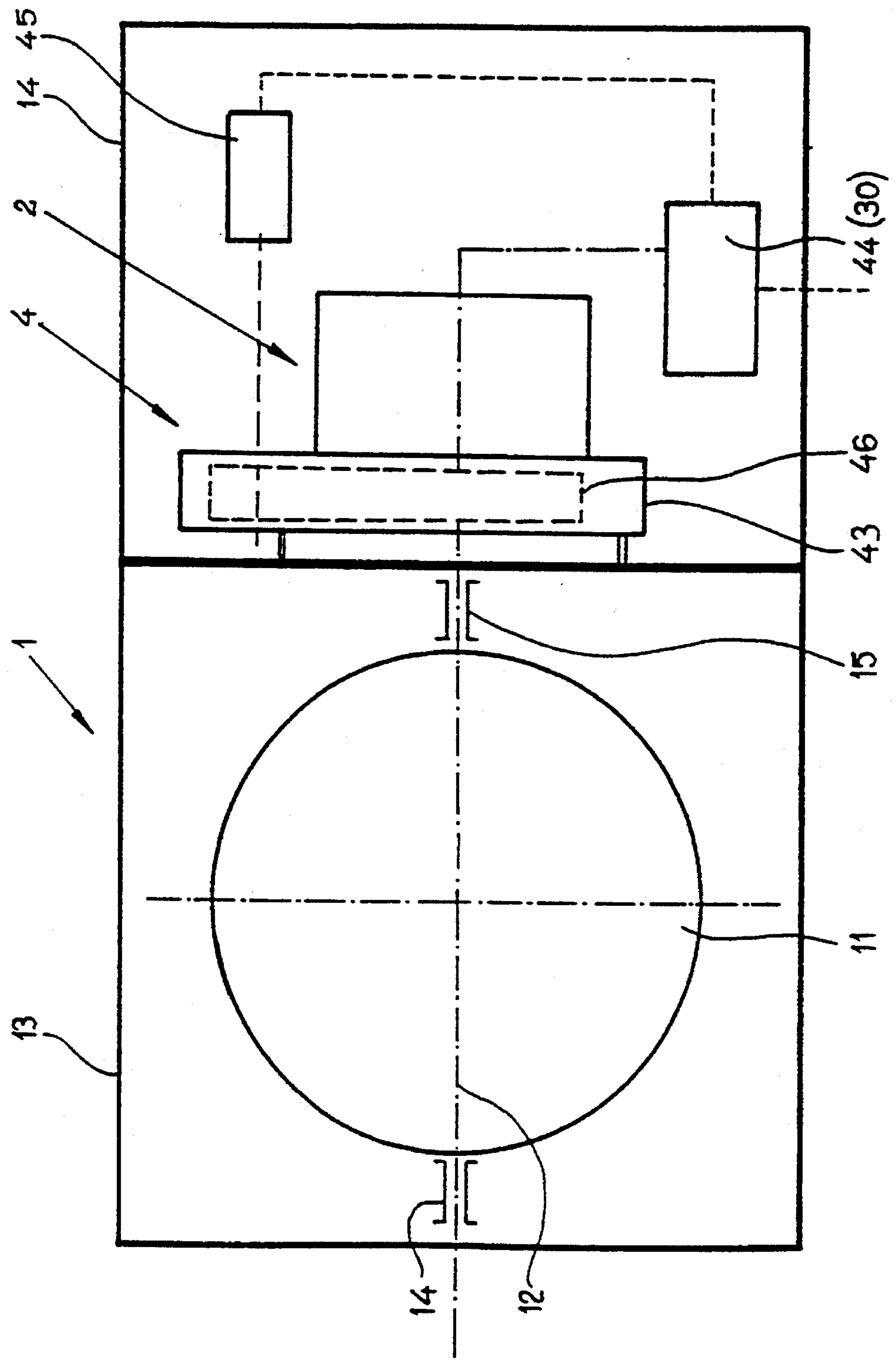
FIG. 7 is a schematic view of another overall throttle-valve assembly with a two-section housing.

The overall throttle-valve assembly illustrated in FIG. 7 will comprise a throttle-valve assembly 1 and a throttle-valve adjustment mechanism 4.

Throttle-valve assembly 1 comprises as hereintofore specified a throttle valve 11 with a throttle-valve shaft 12 extending through it and secured on both sides in at least one throttle-valve bearing 14 or 15. Throttle valve 11 is enclosed in a throttle-valve housing 13. A throttle-valve shaft 12 extends out of the face and opposite end of housing 13.

Throttle-valve adjustment mechanism 4 comprises a angle-of-rotation sensor 2 and a transmission subassembly 46. Sensor 2 and 46 are force fit connected to throttle-valve shaft 12. Transmission subassembly 46 can be enclosed in a transmission-subassembly housing 43. Transmission subassembly is powered by a motor subassembly 45. Controls in the form of a circuitry subassembly 44 are connected to sensor 2 and motor subassembly 45. Circuitry subassembly 44 admits and emits signals through a third input terminal. The circuitry subassembly is intended in particular to detect the position of throttle valve 11 from the state of sensor 2, compare it with an ideal, and, in the event of a deviation, actuate motor subassembly 45 until transmission subassembly 46 restores the valve to its proper position. These subassemblies are enclosed in an actuator housing element 16. Actuator housing element 16 is approximately as wide as throttle-valve housing 13. At the faces of housings 13 and 14 are clips or prongs that help hold them together. These clips or prongs can in particular be specially designed prong-and-socket connectors, spring-and-groove connectors, snap-in connectors, etc.

Figure 8:
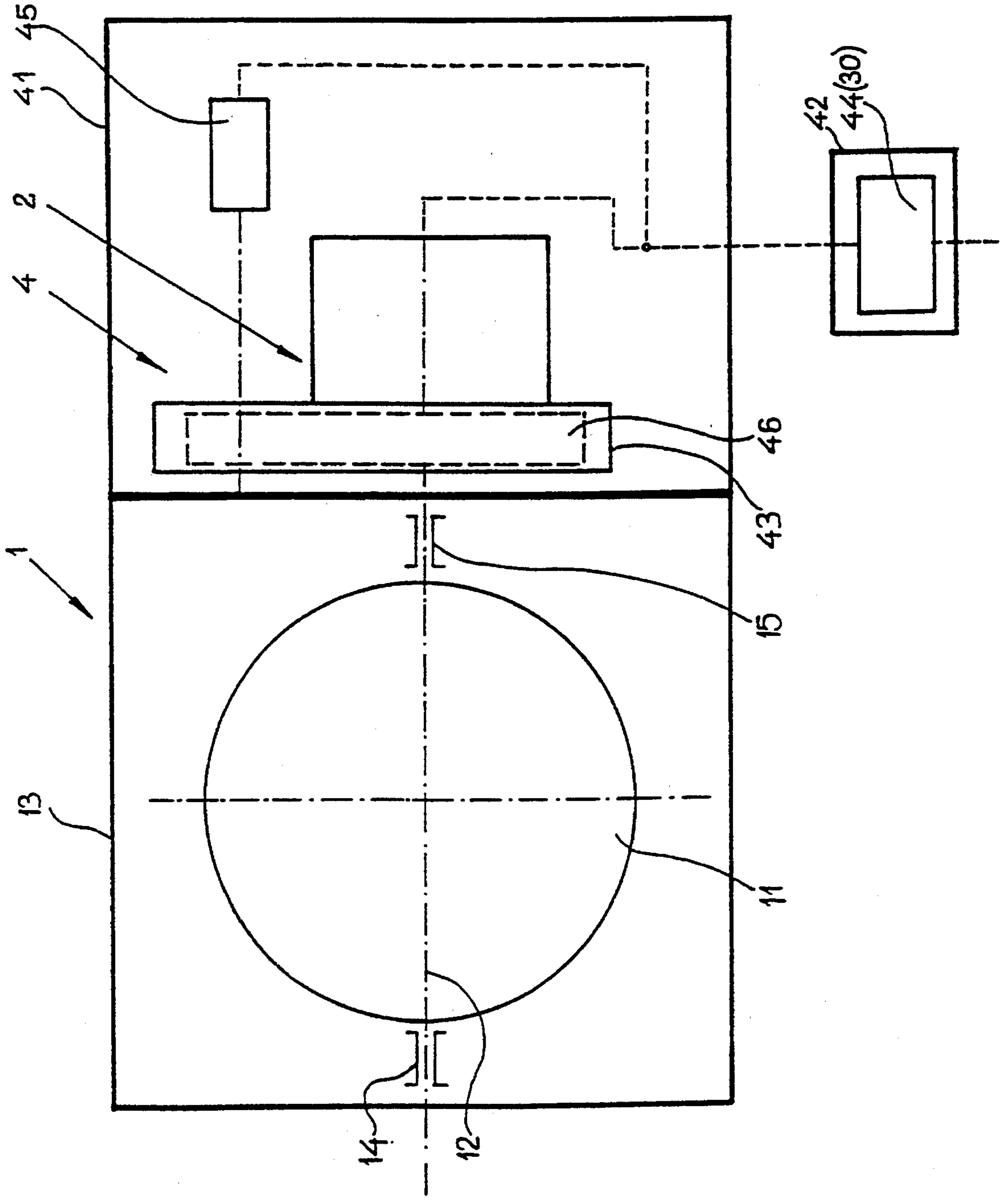
FIG. 8 is a schematic view of an overall throttle-valve assembly like that illustrated in FIG. 7 with a housing in several sections.

FIG. 8 illustrates another embodiment of an overall throttle-valve assembly. It also comprises a throttle-valve assembly 1 accommodated in a throttle-valve housing 13 and accommodating a throttle valve 11 and a throttle-valve shaft 12 in throttle-valve bearings 14 and 15. A angle-of-rotation sensor 2, a transmission subassembly 46, and a motor subassembly 45 are connected as hereintofore specified and accommodated in a regulating-mechanism housing 41. A specially designed electronics housing 42 accommodates a special circuitry subassembly 44. The angle-of-rotation sensor in both embodiments is similar to the ones hereintofore specified. Stator holder 23 needs to be designed to function only as a stator holder.

How these embodiments of an overall throttle-valve assembly is assembled will now be specified.

A throttle valve 11 accommodated in a throttle-valve housing 13 is connected to an engine. Either actuator housing 14 and throttle-valve adjustment mechanism 4 or regulating-mechanism housing 41 and transmission subassembly 46, angle-of-rotation sensor 2, and motor subassembly 45 are attached at the end of housing 13 that throttle-valve shaft 12 extends out of. The clips and prongs ensure that the housing components fit together snugly. A throttle-valve housing 13 and actuator housing element 16 that fit together snugly are employed whenever the objective is an overall throttle-valve assembly that can be assembled in just a few operations. When on the other hand the overall assembly will need to function in very extreme conditions, the second version, wherein throttle-valve housing 13 is connected to regulating-mechanism housing 41 is preferred. This embodiment allows electronics housing 42 to be installed along with circuitry subassembly 44 where heat, mechanical stress, etc. are not so severe. The particular advantage is that ordinary electronic modules can be employed in extreme situations. If necessary, electronics housing 42 can be mounted on regulating-mechanism housing 41 with appropriately designed clips or prongs. Separation into strictly mechanical and into regulating and controlling subassemblies makes it possible to easily combine, assemble, and disassemble throttle valves from various manufacturers with regulating and controlling mechanisms.

To protect the electronically active components from electromagnetic influence, actuator housing element 16, regulating-mechanism housing 41, and electronics housing 42, can be made of the aforesaid electrically conductive long-fiber granulate with 1% to 10% by volume of stainless steel filaments.

There has thus been shown and described a novel regulating device which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

We claim:

1. A regulating device comprising an adjustable throttle-valve shaft accommodated in a housing in a subassembly, a stationary sensor subassembly of a angle-of-rotation sensor accommodating a stator comprising two stator components shaped like blunted crescents secured by a stator-tensioning subassembly and accommodated in a stator holder in the form of a cap, a clearance between the stator components, and another sensor subassembly of the angle-of-rotation sensor that rotates around the stationary sensor subassembly, whereby the rotating sensor subassembly is an annular magnet accommodated in a magnet holder, secured by a spacing disk, and attached to the shaft such that the magnet moves around the stator components and leaves an air gap.

2. Regulating device as in claim 1, wherein the stator components have at least one bezel and at least one tensioning-pin accommodating bore.

3. Regulating device as in claim 1, wherein the stator-tensioning subassembly comprises an essentially circular plate and at least one stator-tensioning pin for each stator component, whereby the plate rests on the stator and is secured to the base of the stator holder by the stator-tensioning pins, which extend through the tensioning-pin accommodating bores in the stator components.

4. Regulating device as in claim 1, wherein the sensor-tensioning plate and the stator-tensioning pins and their attachment to the base of the stator holder are of thermoplastic, preferably injection-molded.

5. Regulating device as in claim 1, wherein the clearance between the stator components accommodates an electromagnetic component, a Hall sensor for example, embedded in resin that occupies the clearance.

6. Regulating device as in claim 1, wherein the magnet-holder subassembly comprises a hollow cylindrical magnet holder and a spacing disk, whereby the spacing disk is attached to the shaft and can be introduced into and secured in the magnet holder.

7. Regulating device as in claim 6, wherein the annular magnet is essentially a hollow cylinder that can be introduced into and secured in the magnet holder.

8. Regulating device as in claim 1, further comprising a central depression in the stator holder facing the clearance.

9. Regulating device as in claim 1, further comprising a circuitry assembly (30) in the form of a flat receptacle (60) on the stator holder.

10. Regulating device as in claim 1, wherein the housing constitutes an overall throttle-valve assembly in at least two separate sections, specifically a throttle-valve housing section, an actuator housing, a regulating-mechanism housing, and a electronics housing, in that a throttle valve and its shaft are accommodated in the throttle-valve housing section with the shaft extending out of it, in that the components of the angle-of-rotation sensor, specifically the stator, which is accommodated in the stator holder, and the annular magnet, which is secured by the magnet holder and by the spacing disk, are accommodated along with a transmission subassembly, a circuitry subassembly, and a motor subassembly in at least one other section of the housing, specifically the actuator housing section, the regulating-mechanism housing section, or the electronics housing section, and in that, once the actuator housing and the regulating-mechanism housing are in position on the throttle housing accommodating at least the angle-of-rotation sensor and the transmission subassembly, the shaft that extends out engages both the transmission subassembly and the spacing disk in the angle-of-rotation sensor, creating a force fit connection.

11. Regulating device as in claim 1, wherein the angle-of-rotation sensor, the transmission subassembly, the circuitry subassembly, and the motor subassembly to be combined into a throttle-valve regulating mechanism accommodated in an actuator housing section constituting the second section of the housing.

12. Regulating device as in claim 1, wherein the angle-of-rotation sensor, the transmission subassembly, and the motor subassembly are accommodated in a regulating-mechanism housing constituting the second section of the housing and the electronics subassembly is accommodated in an electronics housing section constituting the third section of the housing.

13. Regulating device as in claim 1, wherein either the throttle-valve housing and the actuator housing or the throttle-valve housing and the regulating-mechanism housing and optionally the electronics housing are attached together by prongs or clips or both.

14. Regulating device as in claim 1, wherein stator holder is a hollow cylinder open along one side and secured at its wall to the open side of the throttle-valve housing section or to the transmission-subassembly housing section.

15. Regulating device as in claim 1, wherein the stator holder is a cap that can be manufactured along with the central depression, the actuator housing section, the regulating-mechanism housing section, and the electronics housing section of a plastic material, plastic itself for example and especially a high-strength plastic or an electrically conductive thermoplastic or both.

16. Regulating device as in claim 1, the actuator housing section, the regulating-mechanism housing section, and the electronics housing section to be molded ready to use with its electrical and mechanical accommodations already in and through it from an electrically conductive thermoplastic.

17. Regulating device as in claim 1, wherein the electrically conductive thermoplastic is an electrically conductive long-fiber granulate containing 1 to 10% steel fiber by weight.

* * * * *